Aug. 24, 1954     C. A. SCHURR     2,687,497
LOAD MEASURING CONTROL SYSTEM FOR CIRCUIT BREAKERS
Filed Nov. 3, 1950

INVENTOR
Charles Allan Schurr,
BY
John H. Leonard &
Harold J. Rathbun,
his Attorneys.

Patented Aug. 24, 1954

2,687,497

UNITED STATES PATENT OFFICE 2,687,497

LOAD MEASURING CONTROL SYSTEM FOR CIRCUIT BREAKERS

Charles Allan Schurr, Euclid, Ohio, assignor to The Electric Controller & Manufacturing Company, Cleveland, Ohio, a corporation of Ohio Application November 3, 1950, Serial No. 193,944

14 Claims. (Cl. 317—23)

This invention relates to electrical control systems and more particularly to load-measuring systems for automatically controlling the closing and opening of circuit breakers.

Load-measuring control systems for direct current circuit breakers are known which prevent closure of the circuit breaker when the equivalent resistance of the load circuit is below a predetermined safe minimum value, as during a fault or overload condition, and which automatically close the circuit breaker within a definite or variable time after discontinuance of the fault or overload condition raises the equivalent resistance of the load circuit to or above the minimum safe value. In such prior systems, a bridging resistor shunted around the contacts of the circuit breaker permits a reduced load-measuring current to flow continuously through the load circuit while the circuit breaker contacts are open, and the equivalent resistance of the load generally is measured by a means responsive to the resulting drop in potential across all or a portion of the bridging resistor or by means responsive to the division of potential between the bridging resistor and the load circuit. When these known systems have been used in coal mines, fires have resulted from arcs which, drawn in or near coal dust at the instant of fault, are maintained or restruck after the opening of the circuit breaker because the load-measuring circuit itself requires for its operation a relatively high potential across the load circuit and this potential is continuously maintained so long as the circuit breaker is open, and is sufficient to maintain or restrike an arc in the load circuit during the fault.

A further disadvantage of many of the known systems is that a relatively large load-measuring current is required and necessitates that the bridging resistor have considerable thermal capacity.

The circuit breaker control system of the present invention overcomes these disadvantages of prior systems by the provision of a novel load-measuring relay circuit which requires only a very small load-measuring current for its operation and which prevents the potential across the load circuit during a fault from rising above a predetermined low value insufficient to maintain or restrike the usual arc drawn at the instant of the fault.

It is the applicant's understanding that for many years the United States Bureau of Mines and others have suggested the desirability of providing load-measuring automatic reclosing circuit breaker systems used in coal mines with means to interrupt the load-measuring current periodically so as to extinguish any arc that might exist in the load circuit. Insofar as the applicant is aware, however, no load-measuring automatic reclosing circuit breaker system suitable for use in coal mine power branches or sections and providing for a pulsating load-measuring current has been developed heretofore. Although the low voltage that is maintained across the load circuit during a fault by the present system prevents any usual arc drawn at the instant of fault from existing long enough to be hazardous, additional protection against the starting or maintaining of fires, for example, by heat produced by the load-measuring current, may be provided in accordance with this invention by means which periodically interrupts the load-measuring current so that the load-measuring current flows in a series of pulses instead of continuously. The novel load-measuring relay circuit described herein is responsive to the effective resistance of the load whenever the load measuring current flows and is arranged to energize an integrating timing means which controls the closure of the circuit breaker. The time intervals between the pulses of load-measuring current are made sufficiently long to insure that any unusual arc, if present, is extinguished and to insure that any adjacent coal dust heated by the arc is permitted to cool faster than it is heated by the current pulses. The pulsating nature of the load-measuring current also permits a material reduction in the thermal capacity of the bridging resistor.

More specifically in accordance with this invention, a load-measuring relay circuit including an operating winding of an electromagnetic load-measuring relay is connected directly across a load circuit controlled by a circuit breaker, and the resistance of the load-measuring relay circuit is so related to the voltage of the source and to the resistance of a bridging resistor shunted around the contacts of the circuit breaker that the potential across the load circuit while the circuit breaker is open is maintained at such a low value that the possibility of any arc being continued is minimized. The load-measuring relay responds when a fault or overload condition is corrected to initiate operation of a timing means which, after the lapse of a predetermined time, effects reclosure of the circuit breaker. Preferably, the further protection against the maintenance of a fire or of any unusual arcing condition is provided by an additional timing means which periodically interrupts the load-measuring current. The load-measuring relay picks up during flow of the load-measuring current whenever the equivalent resistance of the load is above a predetermined safe value, and drops out when the load-measuring current is interrupted. The periodically operating load-measuring relay supplies impulses of voltage to an integrating timing means which, after a predetermined number of relay operations, effects closure of the circuit breaker. If the equivalent resistance of the load is below the predetermined safe value, the load-measuring relay does not respond to the impulses of the load-measuring current, the integrating timing means does not operate, and the circuit breaker cannot be reclosed.

A general object of this invention is to provide a load-measuring control system for a circuit breaker controlling a load circuit which minimizes the chance of a fire.

Another object is to provide a load-measuring control system for a circuit breaker controlling a load circuit which maintains such a low potential across the load circuit during a fault that the chance of the usual arc drawn at the instant of fault being maintained or restruck is minimized.

Another object is to provide a load-measuring control system for a circuit breaker which includes means for periodically interrupting the load-measuring current.

A further object is to provide an improved load-measuring control system for a circuit breaker controlling a load circuit which requires that only a very small load-measuring current flow through the load circuit during a fault.

A still further object is to provide a load-measuring control system for a circuit breaker in which means directly responsive to the voltage across the load circuit controls the reclosure of the circuit breaker.

A more specific object is to provide a load-measuring control system for a circuit breaker in which, during load-measuring, a load-measuring relay circuit including an operating winding of an electromagnetic relay is connected across the load circuit in series with a bridging resistor, the resistance of the relay circuit being so related to the resistance of the bridging resistor and the voltage of the source that the voltage across the load circuit while the circuit breaker is open is limited to a predetermined low value.

Another specific object is to provide a load-measuring control system for a circuit breaker which includes means for supplying a pulsating load-measuring current to the load circuit during a fault and an integrating timing means operative in response to a predetermined number of impulses of load measuring current after the fault has been removed to close the circuit breaker.

A further object is to provide a load-measuring control system for a circuit breaker including a switch for transferring from automatic to manual operation and an interlocking means arranged to prevent automatic reclosure of the overload relay during manual operation while permitting automatic reclosure of the overload relay during automatic operation.

Other objects and advantages will become apparent from the following description wherein reference is made to the drawing, in which.

Figure 1:
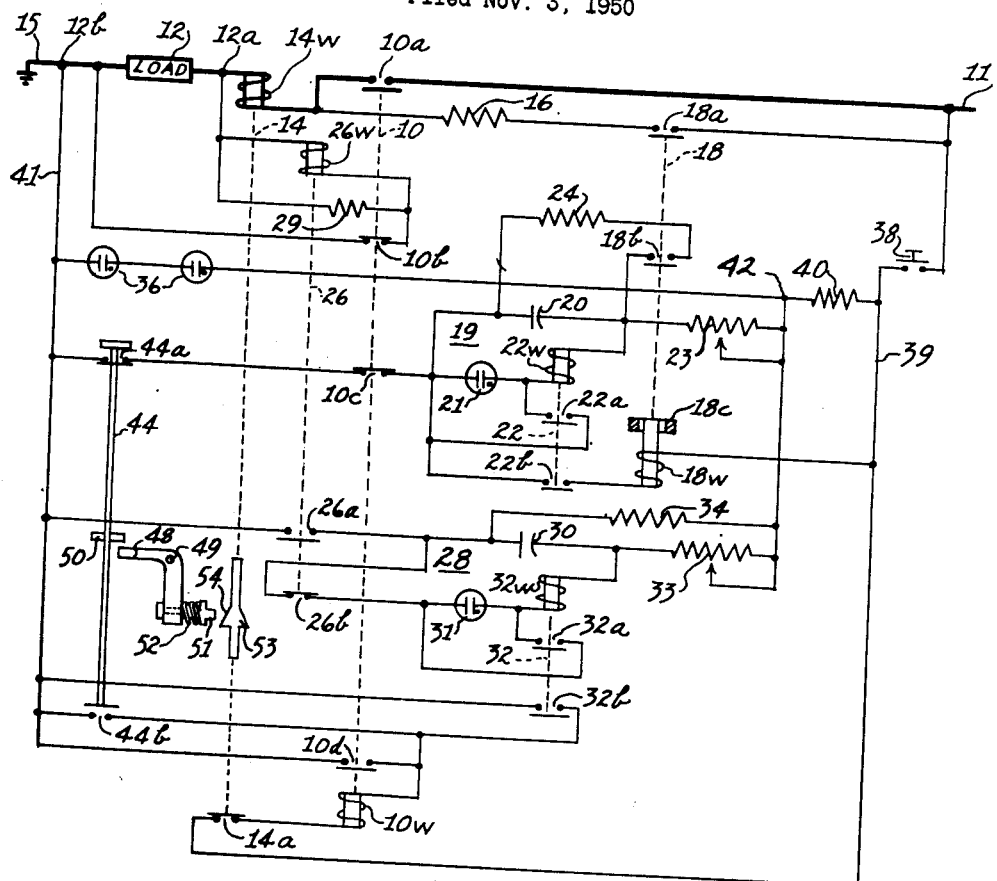
Fig. 1 is a wiring diagram of a preferred embodiment of the invention.

Referring to Fig. 1, an electromagnetic contactor or electromagnetically closed circuit breaker 10 has normally open main contacts 10a arranged to connect a positive power bus or conductor 11 to a load circuit 12 at a load terminal 12a through an operating winding 14w of a suitable overload responsive device or relay 14, a grounded negative power bus or conductor 15 being connected directly to another load terminal 12b of the load circuit 12 which circuit, for example, may include mine lighting and heating equipment and various motors driving mining machinery. The power conductors 11 and 15 may represent a suitable source of direct current for supplying the load circuit 12 or may be a feeder for connecting the load circuit 12 to a remote power source. The circuit breaker 10 has an operating winding 10w, normally closed auxiliary contacts 10b and 10c, and normally open auxiliary contacts 10d. The overload relay 14 has normally closed contacts 14a arranged to control the opening of the circuit breaker 10.

When the contacts 10a are closed, the full voltage between the power conductors 11 and 15 is applied to the load circuit 12 and currents of power magnitude within the setting of the overload relay 14 can be drawn by the load. When the contacts 10a are open, a reduced, load-measuring current flows to the load circuit 12 from the power conductors 11 and 15 through a current-limiting or bridging resistor 16 shunted around the contacts 10a. The circuit through the resistor 16 preferably is controlled by normally open main contacts 18a of an electromagnetic relay 18 having an operating winding 18w, normally open auxiliary contacts 18b, and a suitable means, such as a copper sleeve 18c surrounding its core, for delaying opening of the contacts 18a and 18b for a predetermined time after the winding 18w is deenergized.

In accordance with this invention, the load-measuring current is caused to flow in a series of impulses instead of continuously. This is accomplished by causing periodic operation of the relay 18. Periodic energization and deenergization of the winding 18w to cause repeated pick up and drop out of the relay 18 is controlled by contacts of a suitable timing device 19 which close momentarily at repeated intervals. Since the relay 18 remains in energized position for a predetermined time after deenergization of its winding 18w, the timing device 19 determines the time between impulses of load-measuring current and the relay 18 determines the duration of the impulses.

Preferably the timing device 19 is of the general type disclosed and claimed in Wright Patent No. 2,023,631, issued December 10, 1935, and comprises a capacitor 20, a suitable gas-filled diode or cold cathode glow-discharge tube 21, an electromagnetic relay 22 having an operating winding 22w and normally open contacts 22a and 22b, a timing resistor 23 which may be adjustable if desired, and a resistor 24. The winding 22w is connected in series with the tube 21, the series circuit including the winding 22w and the tube 21 is connected in parallel with the capacitor 20, the resistor 23 is connected in series with the parallel-connected capacitor and tube-relay combination, and the resistor 24 is arranged to be connected in parallel with the capacitor when the contacts 18b are closed. The contacts 22a when closed complete a short circuit around the tube 21.

It is obvious that other suitable types of timing devices may be substituted for the timing device 19 or that the timing periods provided by the device 19 and the relay 18 may both be provided by a unitary timing device including contacts which perform the functions of the contacts 18a or including contacts which control a separate relay which performs the functions of the contacts 18a and not having its own timing feature.

A load-measuring relay circuit including an operating winding 26w of a load-measuring relay 26 is connected directly across the load circuit 12 at the terminals 12a and 12b through the contacts 10b. The relay 26 has normally open contacts 26a and normally closed contacts 26b for controlling a suitable integrating timing device 28. The load-measuring relay circuit may include a resistor 29 connected in parallel with the winding 26w.

Further in accordance with this invention, the resistance of the load-measuring relay circuit is so related to the resistance of the resistor 16 and the voltage between the power conductors 11 and 15 that, when the contacts 10a are open, the potential across the load circuit 12 cannot exceed a low value preferably less than 50 volts. The resistance of the load-measuring relay circuit is either the resistance of the winding 26w or, if the resistor 29 is used, is the combined parallel resistance of the winding 26w and the resistor 29.

Any suitable form of integrating timing device may be used in place of the illustrated timing device 28, for example, a well-known form of motor operated integrating timer would be satisfactory. Preferably, however, the timing device 28 is of the same general type as the timing device 19 and comprises a capacitor 30, a suitable gas-filled diode or cold cathode glow-discharge tube 31, an electromagnetic relay 32 having an operating winding 32w and normally open contacts 32a and 32b, a timing resistor 33 which may be adjustable, and a resistor 34. The winding 32w is connected in series with the tube 31, the series circuit including the winding 32w and the tube 31 is connected in parallel with the capacitor 30 when the contacts 26b are closed, the resistor 33 is connected in series with the parallel-connected capacitor and tube-relay combination, and the resistor 34 is permanently connected in parallel with the capacitor 30 and the resistor 33. The contacts 32a when closed complete a short circuit around the tube 31.

Since the potential between the supply conductors 11 and 15 may in some cases vary to such an extent that the time intervals provided by the timing devices 19 and 28 would be rather erratic, it is often desirable to provide a suitable voltage regulating means such as the series-connected voltage regulator tubes 36. As illustrated, the tubes 36 are connected between the supply conductors 11 and 15 in a circuit from the conductor 11 through a manually operable off and on switch 38, a conductor 39, a resistor 40, the tubes 36, and a conductor 41 to the supply conductor 15.

A source of substantially constant voltage is thereby provided for the timing device 19 which is arranged to be connected in parallel with the tubes 36 between the conductor 41 and a terminal 42 intermediate the tubes 36 and the resistor 40. Energization of the timing device 19 is controlled by the contacts 10c and by normally-closed contacts 44a of a manually operated emergency switch or push button 44 also having normally open contacts 44b, the contacts 10c and 44a being connected in series with each other between the timer 19 and the conductor 41. If desired, the connection of the tubes 36 to the conductor 41 may be through the contacts 10c and the contacts 44a thereby to cause the tubes 36 to be extinguished when the circuit breaker 10 is closed or the contacts 44a are open.

Likewise, a source of substantially constant voltage is provided for the timing device 28 which is arranged to be connected in parallel with the tubes 36 between the conductor 41 and the terminal 42, energization of the timing device 28 being controlled by the contacts 26a which are interposed between the timing device 28 and the conductor 41.

The operating winding 18w of the relay 18 is connected between the conductors 39 and 41 in series with the series-connected contacts 22b, 10c, and 44a. The operating winding 10w of the contactor 10 has one terminal arranged to be connected to the conductor 39 through the contacts 14a and has its other terminal arranged to be connected to the conductor 41 through mutually parallel circuits controlled by the contacts 10d, 32b, and 44b, respectively.

When the push button 44 is in the position shown in the drawing with the contacts 44a closed and the contacts 44b open, the system is arranged for automatic operation and the overload relay 14 recloses automatically after it operates to open the circuit breaker 10. On the other hand, when the push button 44 is moved to a position wherein the contacts 44a are open and the contacts 44b are closed, the system is arranged for manual operation. For manual operation the overload relay 14 remains in open position after it has opened until it is manually reclosed.

This selective operation of the overload relay 14 may be provided by a suitable mechanical interlock between the push button 44 and the relay 14. The form of interlock illustrated comprises a bell crank 48 pivoted at 49 and having one end portion below and in the path of movement of a fixed collar 50 carried by the stem of the push button 44. The other end portion of the bell crank 48 carries a transversely slidable pin 51 biased outwardly by a spring 52 toward the relay 14. When the bell crank 48 is in the position illustrated, the system is arranged for automatic operation, and a suitable stop 53 carried by the overload relay 14 clears the pin 51 and the relay 14 is free to close as well as to open. When the push button 44 is depressed to arrange the system for manual operation, the collar 50 moves the bell crank 48 counter-clockwise and the pin 51 moves into the path of the stop member 53. If the winding 14w is now operatively energized, the plunger of the relay 14 moves upwardly and a conical upper surface 54 on the stop member 53 forces the pin 51 to the left against the bias of the spring 52. When the relay 14 is in its open position, the lower surface of the stop member 53 is above the pin 51, and the spring 52 has forced the pin 51 to the right into the path of the stop member 53 thereby to prevent return of the relay 14 to its closed position until the push button 44 is released or the pin 51 is forced to the left by manually compressing the spring 52.

Further understanding of the embodiment of Fig. 1 can be had from the following description of its operation:

Assuming that the system is arranged for automatic operation with the control elements in the position shown in Fig. 1, closure of the on and off switch 38 connects the conductor 39 to the conductor 11 whereby a substantially constant voltage appears across the tubes 36. This causes the capacitor 20 of the timing device 19 to start to accumulate a charge. After a period of time determined by the adjustment of the resistor 23, the potential across the capacitor 20 increases above the firing voltage of the tube 21 and the tube 21 conducts to cause energization of the winding 22w. Energization of the winding 22w causes closure of the contacts 22a and 22b. Closure of the contacts 22a connects the winding 22w directly across the capacitor 20 so that the winding 23w remains energized for a brief time interval after the arc in the tube 21 is extinguished thereby to maintain the relay 22 in its energized position for a time sufficient for the relay 22 to complete its control function. Closure of the contacts 22b completes the energizing circuit for the winding 18w through the contacts 44a and 10c. The relay 18 in response to the energization of its winding 18w closes its contacts 18a and 18b. Closure of the contacts 18b completes a circuit of low resistance around the capacitor 20 which causes the relay 22 to drop out and prevents the capacitor 20 from accumulating a charge while the relay 18 is in its energized position. Consequent opening of the contacts 22b deenergizes the winding 18w.

Closure of the contacts 18a connects the load circuit 12 between the power conductors 11 and 15 in series with the bridging resistor 16 thereby causing a load-measuring current of small value to flow through the load circuit. The resistance of the resistor 16 and the parallel resistance of the relay winding 26w and the resistor 29 are so related to each other and the voltage between the conductors 11 and 15 that, if the equivalent resistance of the load circuit 12 is above a predetermined safe minimum value, the voltage appearing across the load circuit 12 is sufficient to operatively energize the relay winding 26w. Assuming that the equivalent resistance of the load circuit 12 is at a predetermined value above the safe minimum value, the contacts 26a in response to operative energization of the winding 26w complete the energizing circuit for the timing device 28 and the capacitor 30 starts to accumulate a charge. As mentioned, shortly after the contacts 18a and 18b close, the contacts 22b open and the winding 18w is deenergized. After a time delay period due to the slow decay of flux in the relay 18 caused by the copper sleeve 18c, the contacts 18a and 18b open. Opening of the contacts 18a interrupts the load-measuring current flowing through the bridging resistor 16. The relay 26 is thereupon deenergized and the contacts 26a open to interrupt the charging circuit for the capacitor 30. The charge already on the capacitor decreases very slowly due to the high resistance of the resistor 34.

As soon as the contacts 18b open, the capacitor 20 starts to accumulate another charge and, after a time interval, causes operation of the relay 22 as before. Preferably the timing device 19 is adjusted to provide a delay interval of about three seconds and the relay 18 is selected to provide a time delay interval of about one second. Reenergization of the winding 18w causes the relay 18 to operate again and a second pulse of load-measuring current flows through the load circuit 12. If the load circuit 12 is still in proper condition for closure of the contactor 10, the relay 26 again closes its contacts 26a to increase the charge on the capacitor 30. The relay 18 continues to close and open in this manner thereby to cause repeated operations of the contacts 26a.

After a predetermined number of closures of the contacts 26a, for example, six to ten, the voltage across the capacitor 30 becomes sufficient to break down the tube 31. When opening of the contacts 18a next causes drop out of the relay 26, the consequent closure of the contacts 26b completes the discharge circuit through the tube 31 and the winding 32w around the capacitor 30, and the relay 32 operates to close the contacts 32a and 32b. Closure of the contacts 32a maintains the winding 32w energized after the arc in the tube 31 is extinguished, and closure of the contacts 32b completes the energizing circuit for the winding 10w. The circuit breaker 10 thereupon closes its contacts 10a and 10d and opens its contacts 10b and 10c.

Closure of the contacts 10a completes the power circuit to the load circuit 12 and closure of the contacts 10d completes a holding circuit for the winding 10w around the contacts 32b. Opening of the contacts 10b and 10c insures that the winding 26w and the timing device 19 are not energized while the contactor 10 is closed. Since the contacts 32b can be closed only after the contacts 26b have closed and since the contacts 26b are closed only after the contacts 18a open, no arc is drawn at the contacts 10b thus preventing the winding 26w from being subjected to the full voltage between the conductors 11 and 15 through an arc which might otherwise be maintained at the contacts 10b after closure of the contacts 10a. Any charge left on the capacitor 30 is dissipated in the resistors 34 and 33 and in the winding 32w, the relay 32 returning to its deenergized position shortly after the contacts 10d close.

In event of a fault or overload in the load circuit 12, the overload relay 14 responds to open its contacts 14a which deenergizes the winding 10w. The circuit breaker 10 then returns to its deenergized position. Opening of the contacts 10a disconnects the load circuit 12 from its direct connection to the power conductors 11 and 15. Closure of the contacts 10c causes the timing device 19 again to cause repeated operation of the relay 18 as before. So long as the equivalent resistance of the load circuit 12 is below a predetermined safe value, the potential across the load circuit 12, while the contacts 18a are closed, is insufficient to cause actuation of the relay 26. Accordingly, the capacitor 30 of the timing device 28 cannot start to accumulate charge and the circuit breaker 10 cannot be reclosed. However, as soon as the fault or overload is removed and the equivalent resistance of the load circuit 12 increases to a predetermined value above the predetermined safe value, the relay 26 operates periodically as before to cause the capacitor 30 to start to accumulate a charge. After a predetermined number of operations of the relay 26, the winding 10w is again energized and the circuit breaker 10 closes as before to complete the power circuit to the load circuit 12.

It should be noted that the time delay period which must elapse before the circuit breaker 10 can be reclosed starts only after a fault or overload in the load circuit 12 has been removed. This is necessary for the safety of the personnel engaged in correcting the fault or overload condition.

Should either or both of the timing devices 19 or 28 fail, the push button 44 may be operated to permit manual operation of the system until repairs are completed. When the push button 44 is operated, the contacts 44a open to prevent energization of the timer 19 and the winding 18w, and the contacts 44b close to permit closure of the circuit breaker 10 whenever the contacts 14a and the switch 38 are both closed. The pin 51 is now in the path of movement of the stop 53 and, should the overload relay 14 operate, it will remain in operated position until the pin 51 is moved to the left manually thereby to prevent inadvertent reclosing of the circuit breaker 10.

One example of arithmetical values of the circuit constants providing the relation hereinbefore described is given herein, but is not to be considered as a limitation of the invention. In a control system for a load circuit having a maximum safecurrent rating of 600 amperes and operating from a 550 volt supply, the bridging resistor may have a value of 300 ohms and the combined resistance of the winding 26w and the resistor 29 may have a value of 25 ohms. The relay 26 should be adjusted to pick up when approximately 5.5 volts or more are impressed on its winding 26w, which represents a load resistance of 3.45 ohms or more. A load resistance of 3.45 ohms will permit a load current of 160 amperes to flow upon reclosure of the contacts 10a. With these circuit constants, the maximum voltage across the load circuit 12 while the contacts 10a are open cannot exceed 42 volts regardless of the effective resistance of the load circuit 12.

Figure 2:
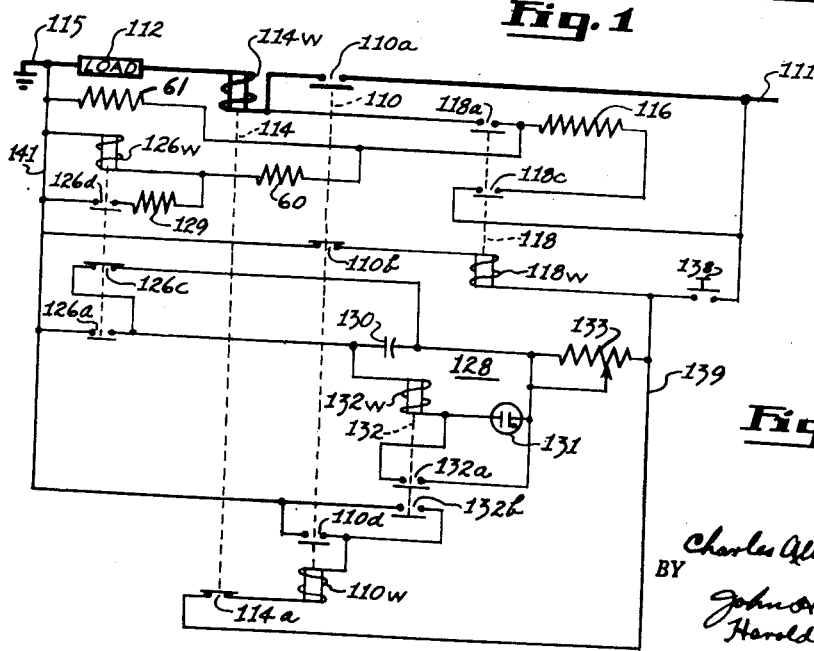
Fig. 2 is a wiring diagram of a modification of the invention.

The embodiment of Fig. 2 shows how the control system of Fig. 1 may be simplified by the elimination of the timing means which causes the load-measuring current to pulsate. Although the advantages of the pulsating load-measuring current are not present in the system of Fig. 2, the advantages of a small load-measuring current and a low voltage across the load circuit while the circuit breaker is open are retained. Parts in Fig. 2 similar to those of Fig. 1 are referred to by the same reference numerals as in Fig. 1 except for the addition of one hundred thereto.

The load-measuring circuit in Fig. 2 comprises a bridging resistor 116 which at one end is connected to a conductor 111 through normally-open contacts 118c of a relay 118 and at the other end is connected to a conductor 115 through normally open contacts 118a, a winding 114w, and a load circuit 112. The load measuring relay circuit comprises an operating winding 126w of a relay 126 connected in series with a resistor 60, the series combination being connected in parallel with the load circuit 112 through the contacts 118a. In order to maintain a close differential between the pick up and drop out current values of the relay 126w, a resistor 129 is arranged to be connected in parallel with the winding 126w when normally open contacts 126d are closed. If desired, the load-measuring relay circuit may include a resistor 61 connected in parallel with the series connected winding 126w and the resistor 60 thereby to limit the maximum current that can flow in the winding 126w. A similar resistor may also be used in the embodiment of Fig. 1. A timing device 128 is arranged to delay reclosure of a circuit breaker 110 for a predetermined time after a fault is removed from the load circuit 112. Normally open contacts 132b of a relay 132 in the timing device 128 control the reclosure of the circuit breaker 110.

In operation of the embodiment of Fig. 2, closure of a switch 138 connects the conductor 111 to a conductor 139 so that an operating winding 118w of the relay 118 becomes energized through normally closed contacts 110b of the circuit breaker 110. The relay 118 thereupon closes its contacts 118a and 118c to connect the load circuit 112 between the power conductors 111 and 115 in series with the resistor 116. Regardless of the equivalent resistance of the load circuit 112, the voltage across the load circuit 112 is maintained at a low value by the relationship between the resistance of the resistor 116 and the combined parallel resistance of the resistor 61 and the series connected resistor 60 and the winding 126w. If no fault exists in the load circuit 112, its equivalent resistance is such that the voltage impressed on the winding 126w is above the pick-up value of the relay 126 which thereupon operates to close its normally open contacts 126a and 126d and to open its normally closed contacts 126c. Closure of the contacts 126d connects the resistor 129 in parallel with the winding 126w so that the relay 126 immediately drops out in event the equivalent resistance of the load circuit 112 should decrease below a predetermined safe value. Closure of the contacts 126a and opening of the contacts 126c permits the capacitor 130 to start to accumulate a charge. After a time delay period determined by the adjustment of the resistor 133, the potential across the capacitor 130 exceeds the firing voltage of tube 131 and the tube 131 breaks down to cause energization of an operating winding 132w of the relay 132. The relay 132 thereupon operates to close its contacts 132a and 132b. Closure of the contacts 132a completes a holding circuit around the tube 131 so that the relay 132 remains in its energized position for a brief interval. Closure of the contacts 132b completes an energizing circuit for the winding 110w. The circuit breaker 110 thereupon operates to close its contacts 110a and 110d and to open its contacts 110b. Closure of the contacts 110d maintains the winding 110w energized after the contacts 132b reopen. Closure of the main contacts 110a connects the load circuit 12 directly across the conductors 111 and 115, and opening of the contacts 110b deenergizes the winding 118w so that the relay 118 opens its contacts 118a and 118c.

In event of a fault or overload in the load circuit 112, the relay 114 opens its contacts 114a momentarily thereby causing the circuit breaker 110 to drop out. The relay 118 moves to its energized position as before, and a load-measuring current flows through the load circuit 112. So long as the fault exists, the voltage across the load circuit 112 cannot exceed a value which would cause pick-up value of the relay 126 and the relay 126 remains in its deenergized position with its contacts 126a open. Consequently, the timing device 128 cannot operate to cause closure of the circuit breaker 110. When the fault has been removed, the voltage across the load circuit 112 increases sufficiently to cause the relay 126 to operate and initiate a timing period as described hereinbefore.

Having thus described my invention, I claim:
1. An automatic reclosing circuit breaker system for controlling the connection between a load circuit of predetermined maximum current rating and a source of unidirectional voltage of predetermined value and comprising a circuit breaker having contact means adapted to be connected in the load circuit so as to connect and disconnect said load circuit to and from said source, electroresponsive means operative when energized to close said contact means, an over- load responsive device arranged to be connected in said load circuit so as to be responsive to the electrical condition of said load circuit for effecting opening of said contact means upon occurrence of a fault condition in said load circuit, a bridging resistor, means rendered operative upon opening of said contact means to connect said bridging resistor in parallel with said contact means, and a load-measuring relay circuit electrically associated with said closing means and operative when said relay circuit is subjected to a voltage above a predetermined value to render said closing means operative, and said relay circuit being connected in parallel with said load circuit and in series with said bridging resistor so as to be subjected to the voltage across said load circuit, whereby when the voltage across said load circuit is above said predetermined value said relay circuit renders the closing means operative.

2. An automatic reclosing circuit breaker system in accordance with claim 1 characterized in that the resistance of said relay circuit is so related to the voltage of said source and to the resistance of said bridging resistor that the voltage across said load circuit when said contact means are open cannot exceed a predetermined low value less than that required to maintain an arc in said load circuit under usual fault conditions.

3. An automatic reclosing circuit breaker system in accordance with claim 2 characterized in that said relay circuit includes an operating winding of an electromagnetic relay adjusted to pick-up only when the voltage impressed on said relay circuit exceeds a predetermined low value indicative that the equivalent resistance of said load circuit is materially above a predetermined value, said relay including contacts electrically associated with said closing means and operative upon pick-up of said relay to render said closing means operative.

4. An automatic reclosing circuit breaker system in accordance with claim 3 characterized in that said relay cooperates with a timing means that delays reclosure of said contact means for a predetermined time after said relay picks up.

5. An automatic reclosing circuit breaker system for controlling the connection between a load circuit of predetermined maximum safe current rating and a source of unidirectional voltage of predetermined value and comprising a circuit breaker having contact means adapted to be connected in series with said load circuit and adapted when closed to conduct currents of power magnitude, load-measuring current control means adapted to supply pulses of load-measuring current when in a closed circuit and energized, means connected to the load-measuring current control means and adapted to connect the load-measuring current control means to said load circuit so as to complete said closed circuit through said load circuit while said contact means are open, circuit breaker reclosing means including voltage-responsive load-measuring means which is operative when subject to an impulse of voltage above a predetermined minimum voltage to effect closure of said contact means, means operative while said contact means are open to connect said load-measuring means in series with said load-measuring current control means and in parallel with said load circuit thereby to subject said load-measuring means to impulses of voltage which appear across said load circuit, and said circuit breaker reclosing means including a normally inoperative time delay means initially rendered operative by the load-measuring means when said load-measuring means is subjected to said impulse of voltage above a predetermined value to impose a substantial time interval between the appearance across said load circuit of a voltage greater than said minimum voltage and the closure of said contact means.

6. An automatic reclosing circuit breaker system for controlling the connection between a load circuit of predetermined maximum safe current rating and a source of unidirectional voltage of predetermined value and comprising a circuit breaker having contact means operative when closed to connect a load circuit of said predetermined current rating to a source of unidirectional voltage of said predetermined value, a bridging resistor, a relay means operative to connect said bridging resistor in parallel with said contact means when said contact means is open, said relay means including a first timing means for maintaining said resistor connected in parallel with said contact means for a predetermined interval and for maintaining said resistor disconnected for predetermined intervals between said first-mentioned intervals, whereby pulses of load-measuring current are supplied to said load circuit when said contact means are open, a second timing means, load measuring means adapted, when in predetermined electrical association with said load circuit, to respond to the electrical condition of said load circuit, while said pulses of current are being supplied to said load circuit, to initiate operation of said second timing means only if the equivalent resistance of said load circuit is above a predetermined value, and means responsive to operation of said second timing means at the expiration of a timing interval to effect closure of said contact means, and means connected to the load-measuring means and operative while said contact means are open to electrically associate the load-measuring means with the load circuit.

7. An automatic reclosing circuit breaker system in accordance with claim 6 characterized in that said relay means comprises a relay which opens with delayed action and which when closed effects said connection of the bridging resistor in parallel with the contact means, and said first timing means is operative to supply pulses of closing current to said relay periodically at intervals greater than the time required for said relay to open thereby causing said bridging resistor to be connected and disconnected repeatedly.

8. An automatic reclosing circuit breaker system for controlling the connection between a load circuit of predetermined maximum safe current rating and a source of unidirectional voltage of predetermined value and comprising a circuit breaker having contact means operative when closed to connect a load circuit of said predetermined current rating to a source of unidirectional voltage of said predetermined value, load-measuring current control means operative to supply pulses of load-measuring current to said load circuit when said contact means are open, a timing means, load-measuring means adapted, when in predetermined electrical association with said load circuit, to respond to the electrical condition of said load circuit, while said pulses of current are being supplied to said load circuit, to initiate operation of said timing means only if the equivalent resistance of said load circuit is above a predetermined value, said load-measuring means comprising an electromagnetic relay connected in series with said load-measuring current control means and in parallel with said load circuit so as to be responsive to the potential across said load circuit when said pulses of current are supplied to said load circuit, means responsive to operation of said timing means at the expiration of a timing interval to effect closure of said contact means, and means connected to the load-measuring means and operative while said contact means are open to connect the load-measuring means in parallel with the load circuit.

9. In an automatic reclosing circuit breaker system of the class wherein a load-measuring current control means including a resistor supplies a load-measuring current from a source of voltage through said resistor to a load circuit and a load-measuring means is responsive to a predetermined electrical condition of the load circuit resulting from the flow of said load-measuring current to effect closure of a circuit breaker for connecting the load circuit to said source of voltage, the combination with the load-measuring current control means of current interrupting means electrically connected thereto for repeatedly interrupting the load-measuring current while the circuit breaker is open, circuit means including said load-measuring means and connected in parallel with said load circuit and in series with said resistor when said load-measuring current is flowing, and said circuit means having a resistance so related to the resistance of said resistor and the voltage of said source that, when so connected, the voltage across said load circuit, while said load-measuring current is flowing, does not exceed a predetermined small fraction of the voltage of said source which fraction is insufficient to maintain an arc in said load circuit under usual fault conditions.

10. An automatic reclosing circuit breaker system for controlling the connection between a load circuit of predetermined maximum safe current rating and a source of unidirectional voltage of predetermined value and comprising a circuit breaker having contact means operative when closed to connect a load circuit of said predetermined current rating to a source of unidirectional voltage of said predetermined value, load-measuring current control means operative to supply pulses of load-measuring current to said load circuit when said contact means are open, a timing means, load-measuring means adapted, when in predetermined electrical association with said load circuit, to respond to the electrical condition of said load circuit, while said pulses of current are being supplied to said load circuit, to initiate operation of said timing means only if the equivalent resistance of said load circuit is above a predetermined value, said load-measuring means comprising an electromagnetic relay connected to said load circuit so as to be responsive to the potential across said load circuit when said pulses of current are supplied to said load circuit, means responsive to operation of said timing means at the expiration of a timing interval to effect closure of said contact means, means connected to the load-measuring means and operative while said contact means are open to connect the load-measuring means in parallel with the load circuit, said relay being rendered operative each time a pulse of current flows through said load circuit while no fault exists in said load circuit, and said timing means including means rendered operative after a predetermined number of operations of said relay to close said contact means.

11. An automatic reclosing circuit breaker system comprising a load circuit having a predetermined minimum safe resistance, a source of unidirectional voltage, a circuit breaker having contact means operative when closed to connect said load circuit to said source, load-measuring current control means operative to supply pulses of load-measuring current to said load circuit when said contact means are open, said load-measuring current control means including means for causing the duration of said pulses and the time between said pulses to be so related to each other and to the magnitude of said load-measuring current that the heat produced at a fault in the load circuit by each pulse of the load-measuring current is substantially dissipated before the start of the next succeeding pulse, a normally quiescent timing means operative to provide a timing interval materially greater than the duration of at least one of said pulses, load-measuring means electrically associated with said load circuit and inoperative when the resistance of the load circuit is below a predetermined safe reclosing value greater than said minimum safe value and rendered operative in response to said pulses of current when the resistance of said load circuit is above said predetermined safe reclosing value, means responsive to the operation of said load-measuring means for initiating operation of said timing means, and means responsive to operation of said timing means at the expiration of said timing interval to effect closure of said contact means.

12. The automatic reclosing circuit breaker system of claim 11 characterized in that said load-measuring means operates each time one of said pulses flows when the resistance of said load circuit is above said safe reclosing value, and said timing means includes means responsive to a predetermined number of operations of said load measuring means to determine the expiration of said timing interval.

13. An automatic reclosing circuit breaker system comprising a load circuit of predetermined maximum safe current rating, a source of unidirectional voltage of predetermined value, a circuit breaker having separable contacts normally connecting said load circuit to said source, load-measuring current control means operative to supply pulses of load-measuring current when in a closed circuit and energized, means connecting the load-measuring current control means to said load circuit and completing said closed circuit through said load circuit while said contact means are open, a normally inoperative timing means, contact means operative when closed to initiate operation of said timing means, load-measuring means connected to said timing means and adapted, when in predetermined electrical association with the load circuit, to respond to the electrical condition of said load circuit, while said pulses of current are being supplied to said load circuit, to effect closure of said contact means only if the equivalent resistance of said load circuit is above a predetermined value, relay means connected to said timing means and responsive to operation of said timing means at the expiration of a timing interval to effect closure of said contact means, means connecting the load-measuring means in said predetermined electrical association with the load circuit while said separable contacts are open, said load-measuring current control means including on-timing means operative to cause said pulses of load-measuring current to be of duration sufficient only to effect momentary closure of said contact means, and said load-measuring current control means including off-timing means related to the on-timing means to cause the on-time of said pulses and the off-time between said pulses to be so related to each other and to the magnitude of said load-measuring current that the heat put into the load circuit by each pulse is dissipated during the next succeeding off-time.

14. An automatic reclosing circuit breaker system comprising a load circuit of predetermined maximum safe current rating, a source of unidirectional voltage of predetermined value, a circuit breaker having separable contacts normally connecting said load circuit to said source, load-measuring current control means operative to supply pulses of load-measuring current when in a closed circuit and energized, means connecting the load-measuring current control means to said load circuit and completing said closed circuit through said load circuit while said contact means are open, a normally inoperative timing means, contact means operative when closed to initiate operation of said timing means, load-measuring means connected to said timing means and adapted, when in predetermined electrical association with the load circuit, to respond to the electrical condition of said load circuit, while said pulses of current are being supplied to said load circuit, to effect closure of said contact means only if the equivalent resistance of said load circuit is above a predetermined value, relay means connected to said timing means and responsive to operation of said timing means at the expiration of a timing interval to effect closure of said contact means, means connecting the load-measuring means in said predetermined electrical association with the load circuit while said separable contacts are open, and said timing means including means for counting the number of times said contact means closes and means responsive to a predetermined number of said closures within a given over-all time interval to terminate said timing interval and cause said response of said relay means.

References Cited in the file of this patent

UNITED STATES PATENTS

| Number | Name | Date |
|---|---|---|
| 1,796,817 | Walty | Mar. 17, 1931 |
| 1,873,970 | Marti et al. | Aug. 30, 1932 |
| 2,528,194 | Van Ryan et al. | Oct. 31, 1950 |
| 2,561,452 | Van Ryan et al. | July 24, 1951 |